US005502557A

United States Patent [19]
Choi et al.

[11] Patent Number: 5,502,557
[45] Date of Patent: Mar. 26, 1996

[54] IMAGE FORMING APPARATUS

[75] Inventors: Min-ho Choi; In-yong Song, both of Suwon, Rep. of Korea

[73] Assignee: Samsung Electronics Co., Ltd., Kyungki, Rep. of Korea

[21] Appl. No.: 328,286

[22] Filed: Oct. 7, 1994

[30] Foreign Application Priority Data

Apr. 12, 1994 [KR] Rep. of Korea .......................... 94-7656
Apr. 12, 1994 [KR] Rep. of Korea .......................... 94-7657

[51] Int. Cl.$^6$ ................................................. G03G 15/01
[52] U.S. Cl. ...................... 355/326 R; 355/271; 355/327
[58] Field of Search ................................ 355/327, 326 R, 355/210, 271

[56] References Cited

U.S. PATENT DOCUMENTS 4,063,724  12/1977  Suda .
4,615,612  10/1986  Ohno et al. .
5,014,095  5/1991  Yamada .

FOREIGN PATENT DOCUMENTS

| 59-50460 | 3/1984 | Japan | 355/326 A |
|---|---|---|---|
| 61-156157 | 7/1986 | Japan | 355/326 A |
| 63-257773 | 10/1988 | Japan | 355/326 A |
| 1-116658 | 5/1989 | Japan | 355/326 A |
| 1-142567 | 6/1989 | Japan | 355/326 A |
| 3-179467 | 8/1991 | Japan | 355/326 A |

*Primary Examiner*—R. L. Moses
*Attorney, Agent, or Firm*—Leydig, Voit & Mayer

[57] ABSTRACT

An image forming apparatus includes a plurality of image forming units having photoconductive devices for forming a latent image and developing devices for developing the latent image, an exposing device for selectively moving to and exposing the respective photoconductive devices, an endless transfer belt for conveying a sheet of paper with respect to the photoconductive devices, and transfer chargers. The apparatus is compact because only the light and small exposing device shifts, thereby enhancing picture quality and performing high-speed printing in stable driving.

5 Claims, 3 Drawing Sheets

IMAGE FORMING APPARATUS

BACKGROUND OF THE INVENTION

The present invention relates to an image forming apparatus for forming an image received from an original document or an image signal on a sheet of paper, and more particularly, to an image forming apparatus for forming a multicolored, unicolored or monochromic image by using different-colored developers.

In order to print an intended image with the image forming apparatus such as a copy machine, printer or facsimile, first, a photosensitive material is exposed according to image information obtained from an original document or a predetermined image source, thereby forming a latent image. Then, a developer (e.g., toner) sticks to the portion where the latent image is formed, in order to develop the image. The developed image is transferred and fixed on a sheet of paper.

To form a color image, usually three (or four) developers for yellow, magenta and cyan (sometimes including black) are used. Being contained in respective developing devices, different-colored developers are sequentially selected, adhered to the portion of latent image of the photosensitive material, and transferred onto a sheet of paper. A color image forming apparatus with a plurality of developers respectively containing the different-colored developers is divided into a fixed type and a rotary type according to the arrangement of the developing devices.

In the fixed type, a plurality of developing devices are fixedly disposed near a photoconductive drum so that a selected developing device operates to apply its developer to the photoconductive drum at its own position (see U.S. Pat. No. 4,063,724).

In the rotary type, the developing devices are radially incorporated in a rotator rotatably installed adjacent to the photoconductive drum. The rotator rotates so that the selected developing device moves to the development area of the photoconductive drum (see U.S. Pat. No. 4,615,612)

The fixed-mode apparatus is unfavorable for miniaturization because a large-diameter photoconductive drum should be needed to secure sufficient space for a plurality of developing devices. Further, since distances from a portion where forming of the latent image of photoconductive material starts, i.e., the portion to be exposed, to a development portion of respective developing devices, are different, the damping amount of the potential of latent image is varied at respective development portions. For this reason, the density of the respective colors developed is not uniform and the color image finally formed on the sheet of paper bears stains, resulting in poor picture quality.

In the rotary type apparatus , at least one developing unit turns upside down when the rotator rotates, and the leakage of a developer contained therein may contaminate the interior of the apparatus. This is detrimental to the maintenance of the apparatus. Moreover, a high driving torque is required to drive the rotator. Therefore, when the rotator rotates, stable driving is difficult due to the occurrence of severe vibration and loud noise. This results in a limit in enhancing image quality.

U.S. Pat. No. 5,014,095 discloses another image forming apparatus which has a different mode from the above-discussed fixed and rotary type. This image forming apparatus, as shown in FIG. 1, comprises an elevation box 3 in which four developing units 2m, 2y, 2c and 2b are stacked. The box 3 is lowered or raised so that a developing unit selected on one side of photoconductive drum 1 moves to the development position of photoconductive drum 1. In this type of apparatus in which developing devices 2m, 2y, 2c and 2b are lowered or raised, the stains caused due to the difference of potential of the latent image between respective developers are removed and the contamination due to the leakage of developer is prevented. However, the mode is still disadvantageous in miniaturization because a sufficient space is needed for moving box 3 accommodating developing devices 2m, 2y, 2c and 2b. Further, a driving power of high torque must be used, which is a hinderance to the stable driving of the apparatus, and the enhancement of image quality is not so effective.

SUMMARY OF THE INVENTION

Therefore, in order to overcome such problems, it is an object of the present invention to provide an image forming apparatus which is compact by optimizing the arrangement and driving mode of a plurality of developing devices.

It is another object of the present invention to provide an image forming apparatus which can be driven with a low torque to enable a stable operation.

It is still another object of the present invention to provide an image forming apparatus which eliminates problems in connection with the leakage of a developer from a plurality of developing devices.

It is yet another object of the present invention to provide an image forming apparatus which enables high-speed printing.

To accomplish the objects of the present invention, there is provided an image forming apparatus for forming an image on a sheet of paper according to image information, the apparatus comprising: a plurality of image forming units each having a photoconductive drum for forming a latent image by means of exposing, and a developing device for containing a predetermined-color developer and developing the latent image, for providing different-color developed images; an exposing device installed to move to the position of a selected image forming unit of the plurality of image forming units and for exposing the photoconductive drum according to the image information; an endless transfer belt for conveying the paper sheet along the outer surface thereof so that the paper sheet passes the photoconductive drums of the plurality of image forming units; a plurality of transfer chargers installed to correspond to the respective photoconductive drums on the endless transfer belt so that the image developed by the photoconductive drum is transferred onto the paper sheet; and paper feeding/ejecting means for feeding the paper sheet to the endless transfer belt and ejecting the paper sheet therefrom.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Preferred embodiments of the image forming apparatus of the present invention will be described below with reference to the attached drawings.

Figure 1:
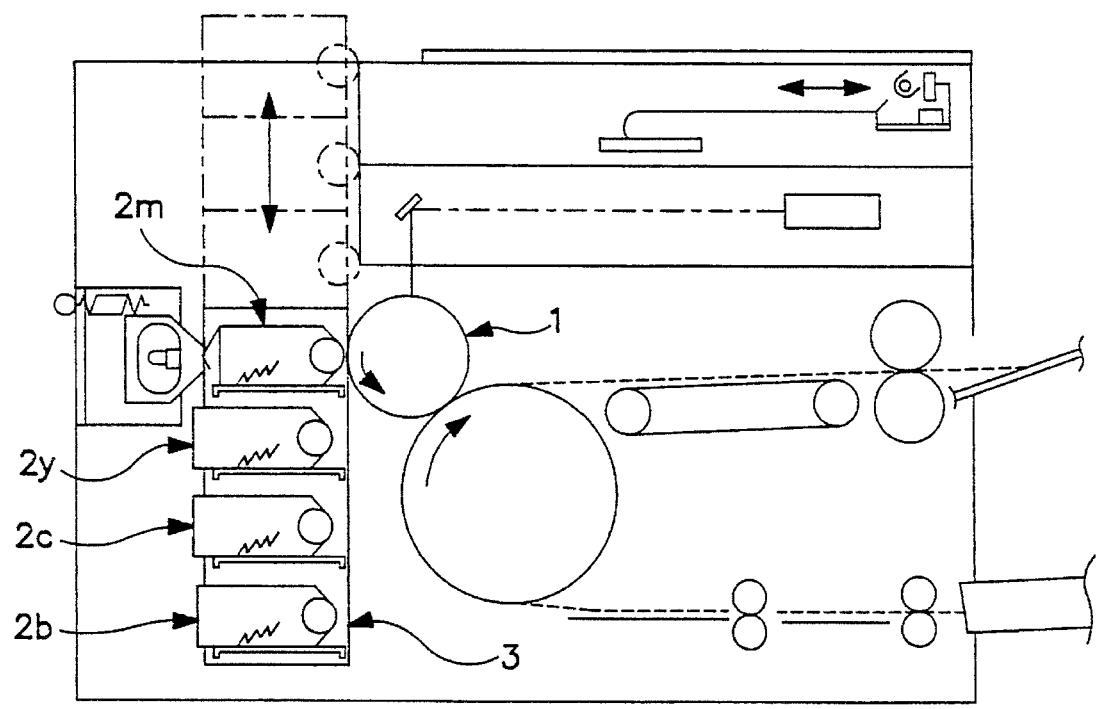
FIG. 1 is a schematic side view of a conventional image forming apparatus having movable developing units.
Figure 2:
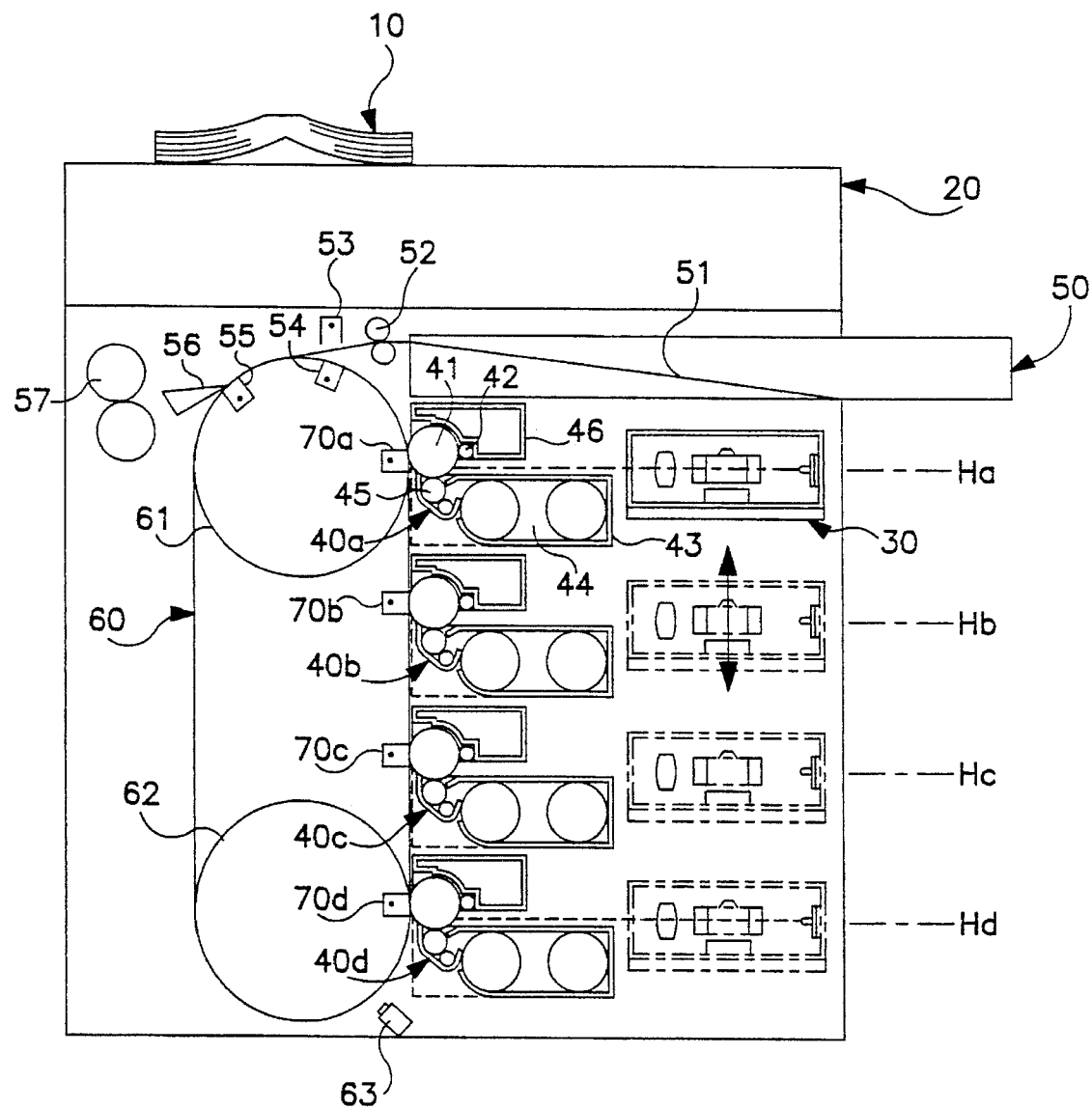
FIG. 2 is a schematic side view of an image forming apparatus of one embodiment of the present invention.

In the image forming apparatus of the present invention shown in FIG. 2, reference numeral 10 indicates an original document. Reference numeral 20 is a scanning unit. Reference numeral 30 is an exposing device. Reference numerals 40a–40d are image forming units. Reference numeral 50 is a paper cassette. Reference numeral 60 is an endless transfer belt. Reference numerals 70a–70d are transfer chargers.

In the apparatus, scanning unit 20, a general optical device for optically scanning the original document 10, outputs an electrical image signal corresponding to image information of obtained from the scanned original document 10 and transmits the signal to exposing device 30.

Exposing device 30 is a laser scanning system for projecting a thin laser beam according to the transmitted electrical image signal. Exposing device 30 is lowered or raised by a driving means (described later) and thereby moves to respective positions Ha–Hd of photoconductive drum 41 of a selected one of plural image forming units 40a–40d.

Each of image forming units 40a–40d includes a photoconductive drum 41, a charging roller 42 for charging photoconductive drum 41, a developing section 43 containing a developer 44 and having a developing roller 45 for coating developer 44 onto the photoconductive drum 41, and a cleaner 46 for removing the remaining developer smeared on the photoconductive drum 41. The four image forming units 40a–40d are stacked so as to provide a developed image of four colors, e.g., black, yellow, magenta and cyan, sequentially from the top. Initially, the surface of photoconductive drum 41 is uniformly charged by charging roller 42. An electrostatic latent image, which cannot be distinguished by the human eye, is formed on the surface portion of the photoconductive drum 41 where the electrical charges are removed by means of exposure of exposing device 30. Developing device 43 rotates developing roller 45 so as to adsorb internally contained developer 44 on the electrostatic latent image formed on photoconductive drum 41 and develop the electrostatic latent image, to form a visible image.

Paper cassette 50 contains sheets of paper 51 and supplies one sheet of paper at a time via supply roller 52 toward endless transfer belt 60. The sheet of paper 51 to be supplied is charged by paper charger 53, and simultaneously therewith endless transfer belt 60 is charged by belt charger 61 so that they attract each other. Discharger 55 removes the electrification state of the endless transfer belt 60 so that sheet of paper 51 is separated from endless transfer belt 60. Scraper 56 rakes across the discharged sheet of paper 51 from the endless transfer belt 60, ejects the separated sheet of paper 51 outside the apparatus, and simultaneously guides it to fixing roller 57 for fixing the image transferred thereon.

Meanwhile, endless transfer belt 60, tightly provided as a joint-free caterpillar around two driving-support rollers 61 and 62 which are detached from each other up and down, rotates to convey the sheet of paper 51 adsorbed thereon. Along endless transfer belt 60, four transfer chargers 70a–70d and a paper sensor 63 are disposed in addition to the above-mentioned belt charger 54 and discharger 55.

Paper sensor 63 detects the leading edge of the sheet of paper 51 conveyed by endless transfer belt 60 and generates an electrical signal. In practice, the electrical signal determines a starting time point of exposure and development, considering the distance from the sensor 63 to the development position of selected photoconductive drum 41 and the conveying speed of the endless transfer belt 60.

Transfer chargers 70a–70d are installed opposite photoconductive drum 41 of developing devices 40a–40d, respectively. When the sheet of paper 51 passes photoconductive drum 41, power is applied to the transfer chargers so as to transfer the image onto the sheet of paper 51 from photoconductive drum 41.

In the preferred image forming apparatus of the present invention, as shown in FIG. 2, exposing device 30 is initially located at the topmost position Ha, a black toner as developer 44 is received in topmost developing device 43 of image forming unit 40a, and yellow, magenta and cyan toners are received in the other developing devices. If a black image is formed, in the state in which exposing device 30 stays at the initial position, paper feeding, exposing, development, transfer and paper ejecting are performed sequentially. Here, the apparatus operates so that the sheet of paper 51 circulates along endless transfer belt 60 by one revolution.

If a color image is printed, exposing device 30 is shifted to respective positions Ha, Hb, Hc and Hd so as to sequentially expose photoconductive drums 41 according to a predetermined sequence, and a corresponding developing device develops the latent image of photoconductive drum 41. Four transfer chargers 70a, 70b, 70c and 70d are also selected and operate in a predetermined sequence. Here, the sheet of paper 51 is set to circulate along endless transfer belt 60 at least two revolutions or, at the most, three or four revolutions. As the revolutions are repeated, respective colors of unicolored images are superimposingly transferred so that the color image is printed on the sheet of paper 51.

In the image forming apparatus of the present invention, unicolors such as red mixed with yellow and magenta, green mixed with yellow and cyan, and blue mixed with magenta and cyan, can be printed as well as black and natural colors.

Figure 3:
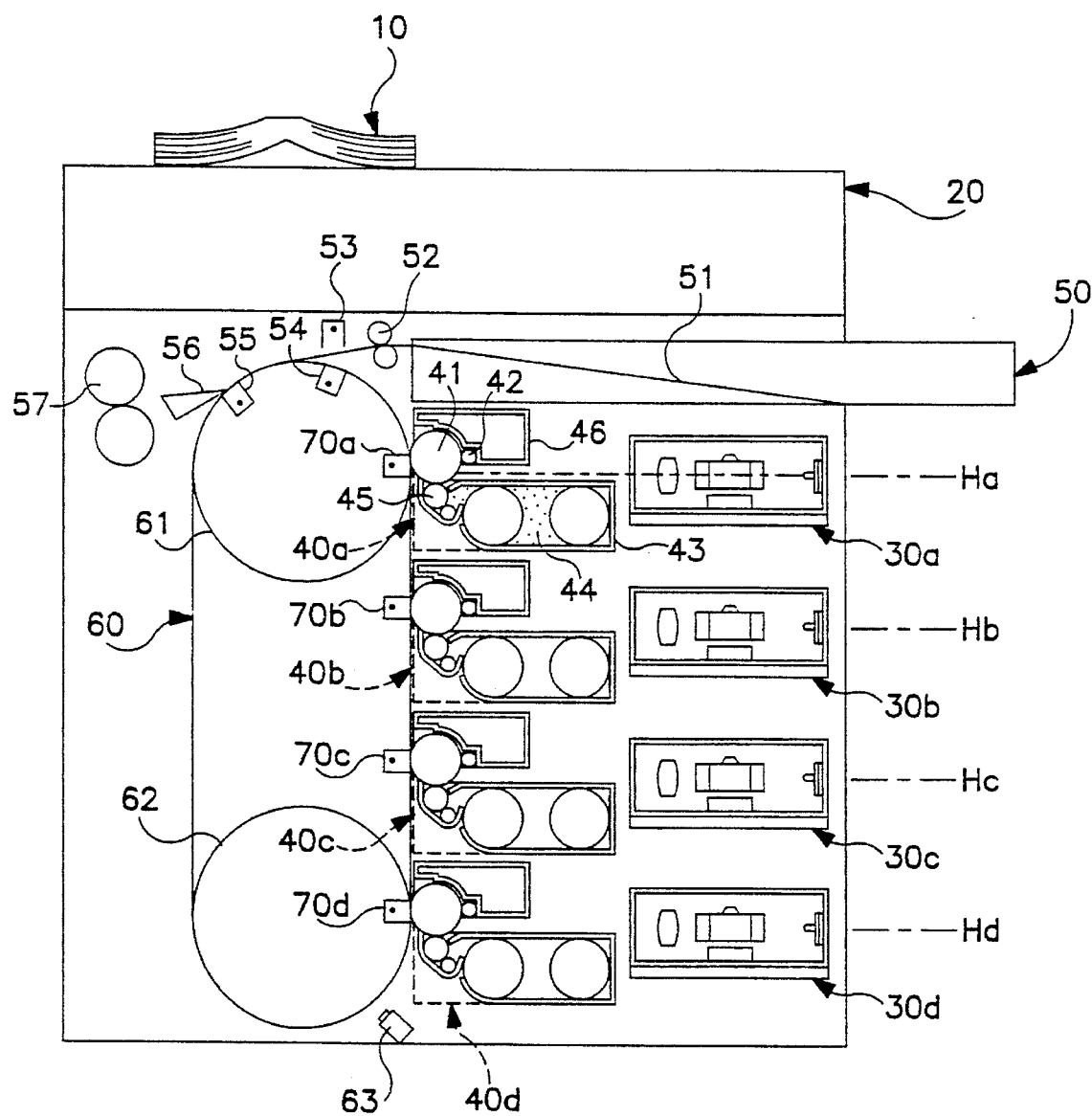
FIG. 3 is a schematic side view of another embodiment of the image forming apparatus of the present invention.

FIG. 3 illustrates a second embodiment of the image forming apparatus of the present invention. In FIG. 3, exposing devices 30a–30d for dedicated use in respective photoconductive drums 41 of four image forming units 40a–40d are fixedly installed at respective positions Ha, Hb, Hc and Hd. For this reason, there is no need of a driving force and devices for moving the exposing device to expose the photoconductive drums 41, therefore the apparatus can operate more stably. Further, the time required to move the exposing device is eliminated, to enable high-speed printing.

As described above, the image forming apparatus of the present invention is compact because it is constructed so that the sheet of paper is delivered using an endless transfer belt and the four large developing devices are fixed. Low torque of force enables relatively stable driving and results in yielding a good quality image. Further, since the four image forming units are fixed, there is no problem with developer leakage. Furthermore, the respective image forming units can be replaced individually, thereby facilitating the maintenance of the apparatus such as the replenishing of developer. Moreover, a plurality of exposing devices for exclusive use in respective photoconductive drums are fixedly installed, thereby accomplishing more stable driving and high-speed printing.

What is claimed is:

1. An image forming apparatus for forming an image on a sheet of paper according to image information, said apparatus comprising:

a plurality of image forming units each having a photoconductive drum for forming a latent image by means of exposing, and a developing device for containing a predeterminedcolor developer and developing said latent image, for providing different-colored developed images;

an exposing device installed to move to the position of a selected image forming unit of said plurality of image forming units and for exposing said photoconductive drum according to said image information;

an endless transfer belt for conveying said sheet of paper along the outer surface thereof so that said sheet of paper passes said photoconductive drums of said plurality of image forming units;

a plurality of transfer chargers installed to correspond to said respective photoconductive drums on said endless transfer belt so that the image developed by said photoconductive drum is transferred onto said sheet of paper; and paper feeding/ejecting means for feeding said sheet of paper to said endless transfer belt and ejecting said sheet of paper therefrom.

2. The image forming apparatus as claimed in claim 1, further comprising a sensor disposed at a predetermined position proximate to said endless transfer belt for sensing said sheet of paper to be conveyed.

3. The image forming apparatus as claimed in claim 1, wherein said plurality of image forming units each are integrally formed by further including an electrifying roller for charging said photoconductive drum and a cleaning means for removing a developer smeared on said photoconductive drum.

4. The image forming apparatus as claimed in claim 1, further comprising a belt charger for charging said endless transfer belt so as to attract said sheet of paper supplied from said paper feeding/ejecting means, and a discharger for removing the electrification state of said endless transfer belt so as to eliminate said attracting force.

5. The image forming apparatus as claimed in claim 1, wherein said paper feeding/ejecting means comprises:

a paper cassette for holding sheets of paper;

a supply roller for drawing out a sheet of paper from said paper cassette and feeding said sheet of paper to said endless transfer belt;

a paper charger for charging said sheet of paper supplied by said supply roller;

a scraper for raking across said sheet of paper from said endless transfer belt; and a fixing roller for fixing said image transferred onto said sheet of paper while ejecting said sheet of paper raked by said scraper.

* * * * *